US005853293A

United States Patent [19]
Weber et al.

[11] Patent Number: 5,853,293
[45] Date of Patent: Dec. 29, 1998

[54] MEDICAL TEACHING AID

[75] Inventors: Alice H. Weber, Toledo, Ohio; Katherine L. Miller, Cambridge City, Ind.

[73] Assignee: Legacy Products, Inc., Toledo, Ohio

[21] Appl. No.: 834,572

[22] Filed: Apr. 7, 1997

Related U.S. Application Data

[60] Provisional application No. 60/015,315, Apr. 12, 1996.

[51] Int. Cl.⁶ .................................................. G09B 23/28
[52] U.S. Cl. .......................................... 434/262; 434/267
[58] Field of Search .................................. 434/262, 263, 434/267, 270, 271, 272, 273, 274, 275

[56] References Cited

U.S. PATENT DOCUMENTS

| | | | |
|---|---|---|---|
| 3,858,351 | 1/1975 | Porter | 446/296 |
| 4,001,951 | 1/1977 | Fasse | 434/267 |
| 4,403,442 | 9/1983 | Blanco et al. | 446/320 |
| 4,762,494 | 8/1988 | Woods | 434/236 |
| 5,411,437 | 5/1995 | Weber et al. | 434/269 |

OTHER PUBLICATIONS

Anatomical Products Catalog, Anatomical Chart Co., 1991–92 Edition p. 68.

*Primary Examiner*—Robert A. Hafer
*Assistant Examiner*—John Edmund Rovnak
*Attorney, Agent, or Firm*—Donald R. Fraser

[57] ABSTRACT

A medical teaching aid comprises a main body portion formed in the shape of a human foot, a fabric conforming to the main body portion, and selected facsimiles of foot conditions which are selectively and releasably received by and retained on the fabric. Alternatively, the medical teaching aid includes simulated nails which also are selectively and releasably received by and retained on the fabric.

17 Claims, 1 Drawing Sheet

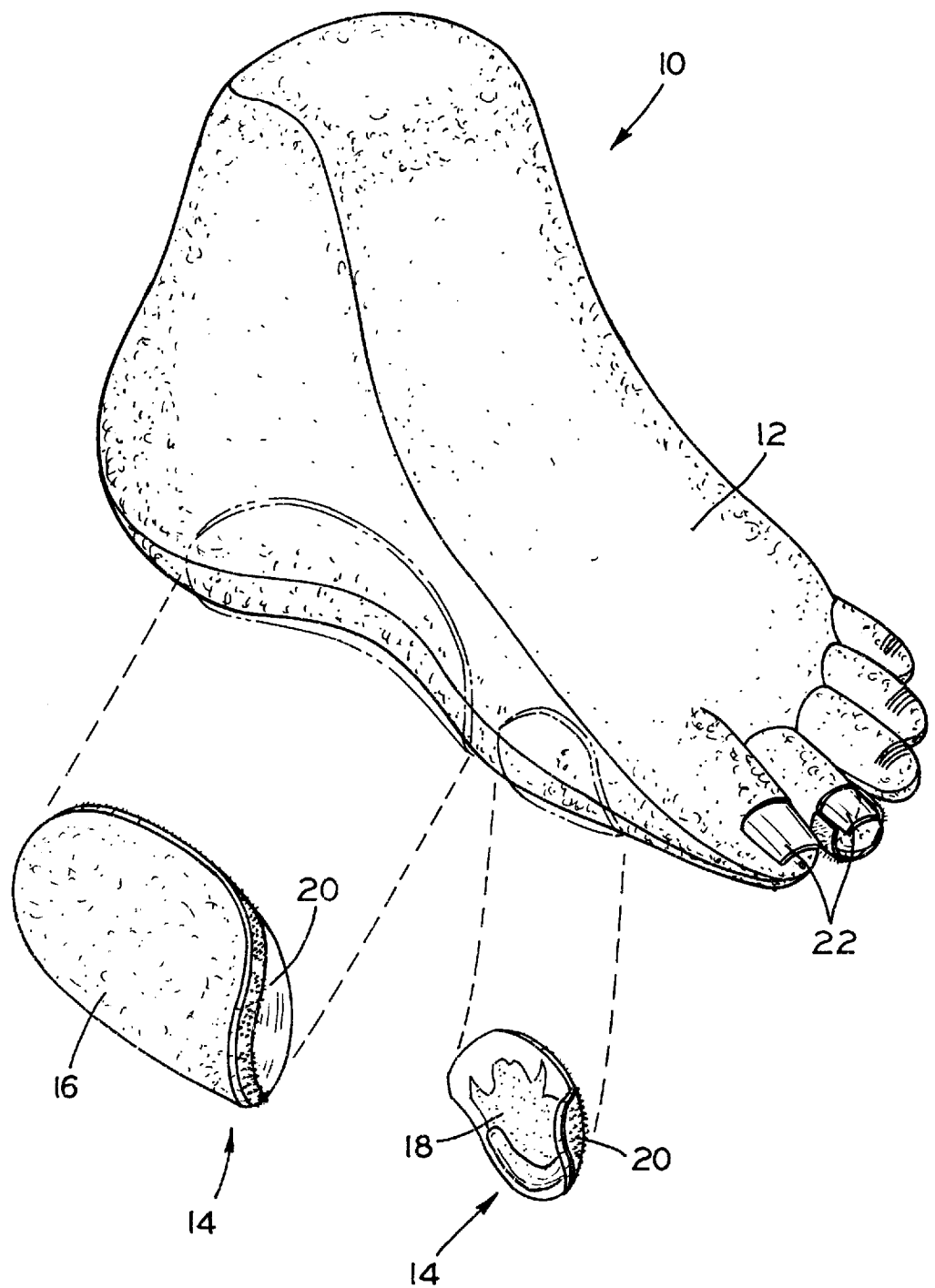

MEDICAL TEACHING AID

This application is filed under the provisions of 35 U.S.C. 111(a) and claims the benefits of a provisional application Ser. No. 60/015,315 filed Apr. 12, 1996 under the provisions of 35 U.S.C. 111(b).

FIELD OF THE INVENTION

This invention relates generally to a medical teaching aid. More specifically, the invention is directed to a teaching aid for instructing medical and health care professionals and lay persons regarding proper foot and nail care and the prevention of foot disorders.

BACKGROUND OF THE INVENTION

Medical and health care professionals prefer to teach proper foot and nail care using illustrations, three-dimensional models, and similar visual aids, to assure the student's grasp of complex foot disorders. There is a need for culturally sensitive and graphic intense methods and devices for teaching and illustrating the prevention of foot disorders. Such methods and devices should encourage interactive participation between the medical professional and patient, should provide for the assessment of patient and family comprehension of the malady discussed, and should be useful for the promotion of appropriate self-management of foot disorders.

SUMMARY OF THE INVENTION

Accordant with the present invention, a medical teaching aid for instructing proper foot and nail care, including the prevention of foot disorders, surprisingly has been discovered. The medical teaching aid comprises:

a main body portion formed in the shape of a human foot; a fabric conforming to the main body portion, the fabric having an inner surface enclosing and adjacent to the main body portion and an outer surface opposite the inner surface; and selected facsimiles of foot conditions selectively and releasably received by and retained on the outer surface of the fabric.

The medical teaching aid of the present invention is particularly useful for teaching proper foot and nail care and the prevention of foot disorders.

BRIEF DESCRIPTION OF THE DRAWING

The novel features that are considered characteristic of the invention are set forth with particularity in the appended claims. The invention itself, however, will best be understood from the accompanying description of specific embodiments, when read in conjunction with the attendant drawing, in which the FIGURE is a perspective view of a medical teaching aid including a main body portion and selected facsimiles of foot conditions.

DESCRIPTION OF THE PREFERRED EMBODIMENTS

The present invention is directed to a teaching aid comprising a main body portion formed in the shape of a foot, a fabric conforming to the main body portion, the fabric having an inner surface enclosing and adjacent to the main body portion and an outer surface opposite the inner surface, and selected facsimiles of foot conditions selectively and releasably received by and retained on the outer surface of the fabric.

The instant invention is useful for teaching proper foot and nail care and for instructing the treatment and prevention of foot disorders. Foot disorders may be unique to the foot, may be similar to disorders found elsewhere in the body but distinctly different when occurring in the foot, or may be identical to those found elsewhere in the body. An example of a unique disorder is a congenital deformity involving the arch of the foot, e.g., pes planus (flatfoot) or pes cavus (high arches). Both may be treated with arch supports or may require surgery. A bunion or hallux valgus affects the joint between the big toe and its metatarsal bone and, when properly diagnosed, may be treated by altering footwear. Distinctive conditions include plantar warts (verruca) which are caused by a virus, ingrown toenails resulting from a common bacterial infection, and athlete's foot (tinea pedis) caused by a fungus. General disorders include arthritis, osteoarthritis, gout, tendentious, and atherosclerosis.

Also, the foot is prone to many skin diseases which occur either through the action of external agents or appear as symptoms of diseases in other parts of the body. Examples include lesions such as a mole, a wheal resulting from an allergy, a tumor, a cyst, or purpura. Lesions may result in impetigo, fissures or sharp breaks in the skin, or ulcers which expose underlying skin. Some foot skin disorders may be caused by chemical or physical agents or infectious organisms. Examples include contact dermatitis, sunburn, poison ivy, heat rash, corns, and calluses. Skin disorders may likewise be caused by infections, resulting in for example, furuncles (boils), carbuncles, or ringworm.

All of the aforementioned maladies may be illustrated and studies utilizing the present invention, with an eye toward teaching one how to prevent and treat same.

Referring now to the FIGURE, there is shown generally at 10 a main body portion of the teaching aid which may be formed in the shape of a human foot. The main body portion 10 is typically formed with an outer covering of a fabric 12 which has an inner surface (not shown) enclosing and adjacent to the main body portion 10 and an outer surface opposite the inner surface. Conveniently, the main body portion 10 may be prepared from an elastomeric material comprising, for example, a polyurethane foam, foam rubber, or a fiber fill material. The primary characteristic required for the main body portion is that it assume the shape of a human foot, as illustrated, and provide internal support for the conforming fabric 12. The fabric 12 is one which will receive and retain facsimiles of foot conditions which are described hereinafter. Suitable fabrics include substantially all conventional fabrics such as, for example, polyester, nylon, rayon or latex film fabrics. Generally, the fabric is given a color that simulates the color of a healthy human foot, for example.

The invention further comprises selected facsimiles of foot conditions 14. Two selected facsimiles 14 are lo illustrated in the FIGURE. The first facsimile 16 illustrates the foot condition generally referred to as flatfootedness. The second facsimile 18 illustrates a skin lesion such as an ulcer. As will be appreciated by one normally skilled in the art, the facsimiles 16 and 18 are shown for purposes of illustration only and are not intended to limit the quantity, size, or types of facsimiles 14 contemplated by the present invention.

The selected facsimiles 14 are selectively and releasably received by and retained on the outer surface of the fabric 12. Thus, the selected facsimiles 14 individually and repeatedly may be applied to and removed from the outer surface of the fabric 12 as deemed necessary for instructing the prevention and care of foot disorders.

Conveniently, the selected facsimiles 14 may be prepared from cloth that will conform to the shape of the main body portion 10 when applied to the outer surface of the fabric 12. Said selected facsimiles 14 may contain indicia representing the visual appearance of the specific foot disorder. Suitable materials from which the selected facsimiles may be made include, without limitation, latex, vinyl, polyester, nylon, felt, and rayon cloth, and the like. The selected facsimiles 14 may be adhered to the outer surface of the fabric 12 by mere frictional engagement between the selected facsimile 14 and the outer surface of the fabric 12, or by utilizing any conventional fastener such as, for example, by using an adhesive or a VELCRO® patch 20.

In an alternative embodiment of the present invention, simulated nails 22 are also selectively and releasably received by and retained on the outer surface of the fabric 12. Those simulated nails 22 illustrated in the FIGURE are adapted to be releasably secured to the toe portion of the body 10 by sliding the bottom edge of the nails 22 into pockets suitably formed at the base of the toe nail bed. Also the nails 22 may be adhered to the fabric 12 utilizing a mildly aggressive adhesive such as, for example, a rubber cement.

It will be appreciated that the main body 10 may be formed in a number of different manners, including the cutting of the fabric 12 in the desired shapes and sewing them together to form the foot, as illustrated; or alternatively, the shape could be produced by utilizing a liquid latex poured into a mold and allowed to harden to the desired shape. The latex film is then removed from the mold and filled with a fiber fill or other elastomeric material.

While the illustrated embodiment of the invention relates to a foot, it will be understood that the invention could be employed for other portions of the human anatomy.

The invention is more easily comprehended by reference to the specific embodiments recited hereinabove which are representative of the invention. It must be understood, however, that these specific embodiments are provided only for the purpose of illustration, and that the invention may be practiced otherwise than as specifically illustrated without departing from its spirit and scope.

What is claimed is:

1. A medical teaching aid, comprising:

a main body portion formed in the shape of a human foot;

a fabric conforming to the main body portion, said fabric having an inner surface enclosing and adjacent to the main body potion and an outer surface opposite said inner surface; and selected facsimiles of foot conditions selectively and reasonably received by and retained on the outer surface of the fabric.

2. The medical teaching aid according to claim 1, wherein the main body portion is prepared from an elastomeric material.

3. The medical teaching aid, according to claim 2, wherein the elastomeric material comprises a polyurethane foam or foam rubber.

4. The medical teaching aid according to claim 2, wherein said elastomeric material comprises a fiber fill.

5. The medical teaching aid according to claim 1, wherein fabric is selected from the group consisting of latex, polyester, nylon, and rayon.

6. The medical teaching aid according to claim 1, wherein the fabric simulates the shape of the human foot.

7. The medical teaching aid according to claim 1, wherein the fabric is a color that simulates color of a healthy human foot.

8. The medical teaching aid according to claim 1, wherein the selected facsimiles of foot conditions are prepared from material distinct from said fabric.

9. The medical teaching aid according to claim 8, wherein said material is selected from the group consisting of latex, vinyl, polyester, nylon, rayon, and felt.

10. The medical teaching aid according to claim 1, wherein the selected facsimiles of foot disorders include fastening means.

11. The medical teaching aid according to claim 10, wherein the fastening means is a VELCRO® patch or an adhesive.

12. The medical teaching aid according to claim 1, further comprising simulated nails selectively and releasably received by and retained on the outer surface of the fabric.

13. The medical teaching aid according to claim 12, wherein the simulated nails include fastening means.

14. The medical teaching aid according to claim 13, wherein the fastening means is a VELCRO® patch or an adhesive.

15. A medical teaching aid, comprising:

a main body portion formed in the shape of a human foot, said main body portion prepared from an elastomeric material;

a fabric conforming to the main body portion, said fabric having an inner surface enclosing and adjacent to the main body portion and an outer surface opposite said inner surface, said fabric selected from the group consisting of latex, vinyl, polyester, nylon, and rayon, said fabric having a color that simulates the color of a healthy human foot;

selected facsimiles of foot wounds or conditions selectively and releasably received by and retained on the outer surface of the fabric, said selected facsimiles of foot wounds or conditions prepared from material selected from the group consisting of latex, vinyl, polyester, nylon, rayon, and felt, said selected facsimiles of foot conditions including fastening means; and simulated nails selectively and releasably received by and retained on the outer surface of the fabric.

16. The medical teaching aid according to claim 15, wherein the elastomeric material comprises a polyurethane foam or foam rubber.

17. The medical teaching aid according to claim 15, wherein the fastening means for the selected facsimiles of foot wounds or conditions is a VELCRO® patch or an adhesive.

* * * * *